United States Patent

[11] 3,543,826

| [72] | Inventor | Harcourt L. Forgaard |
| --- | --- | --- |
| | | 20 Hall Lane, Hagley, England |
| [21] | Appl. No. | 748,734 |
| [22] | Filed | July 30, 1968 |
| [45] | Patented | Dec. 1, 1970 |
| [32] | Priority | Aug. 5, 1967 |
| [33] | | Great Britain |
| [31] | | No. 36058/67 |

[54] STIFF NUT
9 Claims, 4 Drawing Figs.

| [52] | U.S. Cl. | 151/21 |
| --- | --- | --- |
| [51] | Int. Cl. | F16b 39/28 |
| [50] | Field of Search | 151/21(B), 21(A&C), 22; 85/32; 10/86(A) |

[56] References Cited
UNITED STATES PATENTS

| 2,679,879 | 6/1954 | Engstrom | 151/21(B)UX |
| --- | --- | --- | --- |
| 3,079,830 | 3/1963 | Faroni et al. | 151/21(B)UX |
| 3,277,942 | 10/1966 | Dwyer | 151/21(B)UX |

FOREIGN PATENTS

| 1,228,099 | 3/1960 | France | 151/21(B)UX |

Primary Examiner—Ramon S. Britts
Attorney—Friedmann & Goodman

ABSTRACT: A prevailing torque stiff nut comprising a body with an internally threaded opening the exterior of the body having a number of circumferentially spaced axially extending grooves, each of which is of maximum depth at the top face of the nut and tapers in cross section down to zero on the exterior of the body a short distance from the abutment end face of the nut, there being a radially extending buttress between each two adjacent grooves and the prevailing torque stiff feature being provided by acting, with radially inwardly directed forces, at the top portion of the nut, upon each buttress of two pairs of buttresses, which two pairs are arranged symmetrically on opposite sides of a diameter of the nut.

Patented Dec. 1, 1970 3,543,826

STIFF NUT

BACKGROUND OF THE INVENTION

This invention relates to a type of nut generally now known as a prevailing torque stiff nut and being of the broad class of nuts in which the nut has part of its internal thread deformed or distorted or altered in some way so as to apply an increased frictional grip to the threads of a bolt or other externally threaded stem to which the nut is applied, and hereinafter the expression "bolt" is to be taken as including within its scope not only conventional bolts but other forms of externally threaded stem, such as a stud, which are adapted to have a nut applied thereto.

The purpose of providing this extra frictional grip on the threads of the bolt is so as to resist tendency for the nut to work loose when such a nut is used in applications where the assembly of nut and bolt is subject to vibration or other external forces which might give rise to loosening of the nut.

The invention is concerned with improvements on the type of prevailing torque stiff nut above referred to in which at the end face of the nut remote from the abutment face the body of the nut is acted upon so as to displace portions thereof inwards so as to deform the internal thread at, and adjacent, this end face. It will be appreciated that the abutment face of the nut is that face which engages an abutment surface when the nut is engaged upon its associated bolt in a nut and bolt assembly. Hereinafter, the expression "prevailing torque stiff nut of the type specified" refers to this particular type of prevailing torque stiff nut.

DESCRIPTION OF THE PRIOR ART

In several kinds of this type of stiff nut at present in use the deformation is of an elliptical nature and provides an elliptical form at the end face of the nut, and in the case of the solid nut of hexagonal form, this elliptical deformation takes place over the first one or two threads and is obtained by applying pressure inwardly across flats of the hexagon body, so that the circular form of thread is distorted to an elliptical form but this results in contact only over two very short segments of the threads at two diametrically opposed positions giving rise to highly localised peak contact pressures for providing the increased frictional grip between the nut and bolt threads. These highly localised contact pressures may relax as a result of creep deformation taking place in the threads in course of time so that the increased frictional grip originally evident in the high tightening torque will relax.

In another kind of prevailing torque stiff nut of this type the nut body is provided at the one end with a circular cross section collar of reduced diameter and elliptical deformation is obtained by pressing inwardly at diametrically opposed points or by rolling the collar between dies and again an elliptical form is obtained for the first one, two or three threads but also only providing contact over short segments with the result of peak pressures very highly concentrated over small areas of the thread with the risk that these pressures will relax as the result of creep deformation in the bolt thread and the nut thread in the course of time.

In other kinds of prevailing torque stiff nuts of this general type, pressure is applied to the nut body or to a collar at the end of the nut body at three or more positions, around the axis of the nut and again in this case a deformation is obtained which whilst providing contact over short segments will produce very high peak contact pressures over very short distances with the result that these pressures must gradually relax as the result of creep deformation.

It will be appreciated that deformation of the threads as described above is limited and therefore also the frictional grip produced by it, because of damage to bolt and nut threads which will a occur if the permissible deformation is exceeded.

The object of the invention is to provide an improved prevailing torque stiff nut of the type specified which is more efficient because the contact pressure between nut and bolt is distributed over much larger and predetermined segments of the nut, and the pressure distribution is much more uniform for the same total pressure and consequently creep deformation and relaxation are avoided. There is less risk of damage to bolt and nut threads and the capability of greater reuse of the nut, without appreciable loss of locking torque, than known prevailing torque stiff nuts of this type as used hitherto, and a further object is to provide a prevailing torque stiff nut of the type specified which will be lighter, size for size, than stiff nuts used hitherto, without loss of axial strength.

SUMMARY OF THE INVENTION

According to the invention, there is provided a stiff nut of the type specified including a body, six grooves formed in the external surface of said body extending generally in the direction of the nut axis, each of said grooves being of a maximum depth at its end remote from the abutment face of the nut and progressively decreasing in depth in the direction towards the abutment face so as to terminate on the exterior of the nut body at a position spaced from the abutment face of the nut, each portion of the nut body, in between two adjacent grooves being in the form of a radially extending buttress defining a corner of the nut body, each buttress being chamfered at its end remote from the abutment face of the nut and two pairs of said buttress on opposite sides of a diameter of the nut being acted upon at the end thereof remote from the abutment face in a direction along the axis of the nut to produce a force acting radially inwardly on each of such four buttresses whereby the axial depth of the chamfer on each of said four buttresses is increased and two arcuate areas of the nut thread on opposite sides of said diameter are forced radially inwardly, said arcuate areas being of substantially the same axial depth as the axial depth of the chamfer on each of said four buttresses and said two pairs of buttresses being arranged symmetrically on opposite sides of a diameter of the nut body.

The advantages of the improved nut, according to the invention, will be apparent from a reading of the following detailed description of one form of nut embodying the invention, which description is given by way of example only to illustrate the method of carrying the invention into effect. This description is made with reference to the accompanying drawings.

DESCRIPTION OF THE PREFERRED EMBODIMENT

Figure 2:
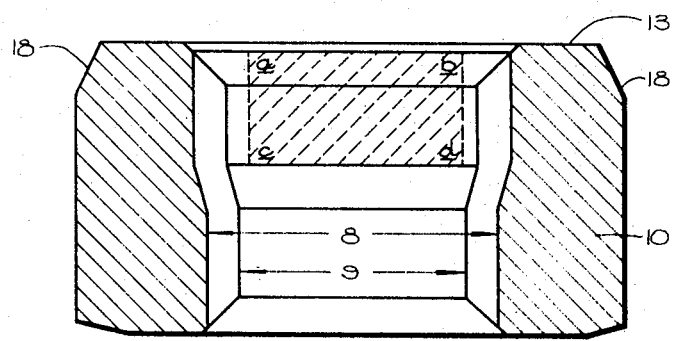
FIG. 2 is a section on the line 2–2 of FIG. 1, partly in diagrammatic form.
Figure 3:
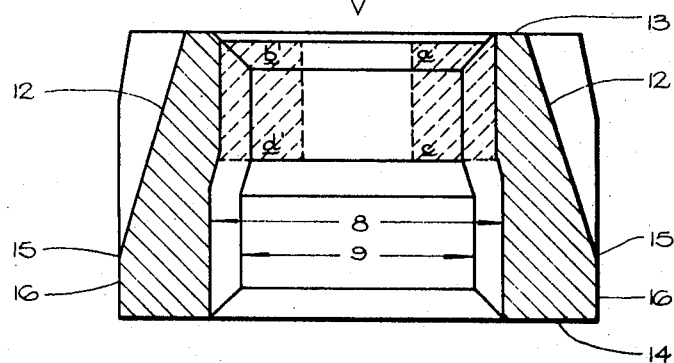
FIG. 3 is a section on the line 3–3 of FIG. 1, partly in diagrammatic form.

In FIGS. 2 and 3, the thread form is not shown in full but is represented by the lines 8 and 9. This is for the purpose of showing more clearly the change in the thread form when the prevailing torque stiff feature is applied to the nut as hereinafter described.

In the example shown in the drawing, the nut body 10 is of hexagonal form and along each of the flat sides 11 the body is provided with a groove 12 which has a maximum depth at the end face 13 which is remote from the abutment face 14 of the nut body and, as will by be seen from FIG. 3, the depth of the groove decreases progressively in the direction from the face 13 towards the abutment face 14 and the groove terminated on the exterior of the nut body at a position 15 a short distance away from the abutment face 14.

The nut is tightened in the usual way using a conventional hexagon spanner or socket spanner or alternatively a special form of wrench may be employed which has fingers engaging in the grooves 12 and such form of wrench is particularly advantageous in cases where the nut is located in a recess or being applied to a bolt with restrictions such as walls adjacent the bolt which might prevent the application and operation of a normal form of spanner.

In forming the grooves 12, there is thus left between each pair of adjacent grooves a radially extending buttress 17 and each buttress, which constitutes a corner of the hexagon, extends for substantially the full axial depth of the nut at the maximum radius of the corner of the hexagon, except for a portion near the end face 13 where, as will be seen from FIG. 2, there is provided a slight arcuate chamfer 18 which is for a purpose hereinafter to be referred to in connection with the method of acting upon this end of the nut to provide the prevailing torque stiff feature. The arc of the chamfer 18 is concentric with the axis of the nut. The star-formed shape, i.e. the grooves with supporting buttresses, provides a strong, very flexible upper half of the nut towards end face 13.

Figure 1:
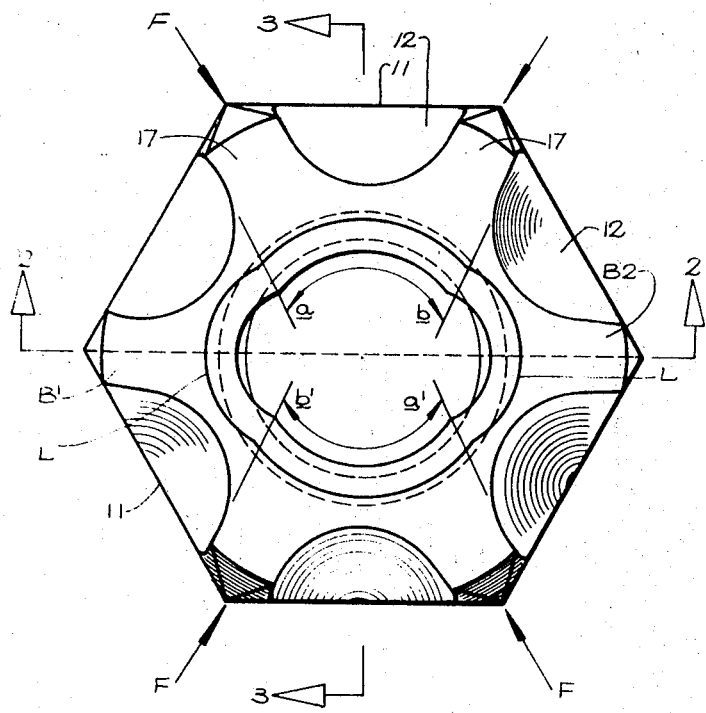
FIG. 1 is a plan view of the improved prevailing torque stiff nut.

Each groove 12, as will be seen from FIG. 1, has a generally arcuate or part-circular cross section, the maximum cross section of the groove being at the end face 13 and the cross section gradually decreasing in the direction towards the abutment face 14 so that the groove tapers out gently. The particular form of nut and the shape and the cross section of the grooves makes the nut advantageously susceptible to production by cold forming and this is of considerable advantage from the point of view of economical mass production of such nuts. The cold deformation has the further advantage of raising the yield point and elastic limit of the material with the result that after cold forming the nut will behave elastically at much higher stress limits than the undeformed material used in manufacture.

The nut formed, as so far described, has a plain central hole which is then provided with a screw thread in the normal way.

The method of acting upon the nut body, at the end face 13 to provide the prevailing torque stiff feature, is obtained with the use of a hollow punch applied to this end of the nut in the direction of the arrow A indicated in FIG. 3. The punch has an internal tapered recess of a diameter to correspond to the diameter of the taper 18 on the buttresses 17 but with two diametrically opposed portions of the wall which are relieved by forming recesses. With reference to FIG. 1, the two pairs of buttresses which are acted upon are those on opposite sides of the section line 2-2 and the aforesaid, tapered internal recess acts upon these four buttresses, the two buttresses indicated at B1 and B2 being not contacted by the punch because of the two aforesaid relieved portions so that as the punch descends the forces are applied to the remaining four buttresses only.

The result of the downwards application of the punch, and the cooperation between its internal tapered recess and the tapered face 18 on the said four buttresses, results in each one of these four buttresses being subjected to a force F which is directed inwardly along a radius of the nut, as is shown by the arrowed lines in FIG. 1, and this has the result of forcing bodily inwardly towards the centre of the nut the flexible sections of the nut wall and thread between the lines marked $a$–$b$ and $a^1$–$b^1$, in FIG. 1. The results of this inward movement is that the diameter of the already threaded hole in the nut is slightly reduced to a smaller diameter screw thread but without altering the thread form or pitch in the area $a$–$b$ and $a^1$–$b^1$. The result of this reduction in the nut's thread diameter is that the two other remaining portions of the screw thread indicated at L, and which are diametrically opposed, are forced in the radially outwards direction.

Referring now to FIGS. 2 and 3, the action of the punch on the said four buttresses increases the depth of the chamfers 18 on these buttresses (in the axial direction of the nut), so that the forces F act over an area of thread, on opposite sides of section line 2-2, indicated by the broken line shaded areas $a,b,c,d$, and $a^1,b^1,c^1, d^1$. Over these areas the screw threads diameter has been reduced but thread form and pitch are not changed. Thus two substantial areas of threads are provided avoiding the creation of peak contact pressures with a virtually uniform distribution of the total contact pressure over these two large areas. As already mentioned this uniform pressure distribution avoids the possibility of creep deformation taking place with time and relaxing the original contact pressure. The increase in depth of these four chamfers 18 is not seen in the drawings but it will be appreciated that the final depth of said chamfers, in the finished nut, is substantially the same as the axial depth of said shaded areas.

The chamfer on the two buttresses at L remains unchanged from its initail form. The result of this is that when such nut is applied to the mating thread of a bolt there is a substantial interference or frictional grip provided between both flanks of engaging threads over the two areas $a,b,c,d$, and $a^1,b^1,c^1,d^1$. as distinct from only short segments of indeterminate length of increased frictional grip provided in prevailing torque stiff nuts of this type as known hitherto and as referred to in the opening part of the this specification. Thus instead of increased frictional grip at two, three or more positions of only short segments of indeterminate length, there is provided with the nut of the present invention increased frictional grip over the said predetermined circular areas on opposite sides of the section 2-2 resulting in a far more uniform and favourable pressure distribution between the mating threads of the nut and bolt completely avoiding the high peak pressures produced by the prior prevailing torque stiff nuts described.

In practice, and from tests, it has been shown that there is an area of approximately 80 percent of increased frictional grip provided between both flanks of the engaging threads over the first one to three convolutions of thread in the nut. It will be appreciated that the reduced wall thickness of the nut body provided by the maximum depth of the grooves 12 at the end face 13 gives this portion of the nut body the required resilience to permit the above described change and also the required resilience to permit a substantial amount of reuse of the nut without significant loss of the increased frictional grip provided.

Because there is increased frictional grip over such a large area of contact between both flanks of the mating threads (as distinct from short segments of indeterminate length) there is only gentle pressure exerted on the bolt threads whereas, with short segments of indeterminate length, very heavy pressure must exist to provide any increased frictional grip. Thus with the present invention there is no danger of damage to the bolt threads and as only gentle pressure is involved the nut can be reused many times without significant loss of efficiency.

Furthermore, it is a recognised fact that in a nut and bolt assembly which has been tightened so that there is tension in the bolt shank the stress system is such that the majority of the load on the nut is taken through the first few threads of the nut adjacent its abutment end face which is the face 14 as shown in the drawings. This effect is illustrated diagrammatically in FIG. 4 which shows, on the left-hand side, the path of the lines of stress through the nut and shank of the bolt in a conventional nut and bolt assembly when tightened. For example, in a nut having six threads it is known that approximately three-quarters of the load is taken upon the first three threads of the nut adjacent this end face while something less than 10 percent of the load is taken upon the sixth thread which is furthest away from the abutment end face. The lines of stress in such a conventional nut and bolt stem shown in FIG. 4, starting from the abutment surface engaged by the nut, pass upwardly through the nut body and turn back through 180° before passing down the shank of the bolt and the maximum concentration of lines of stress is over an area passing through the first two or three threads of the nut adjacent its abutment end face.

Figure 4:
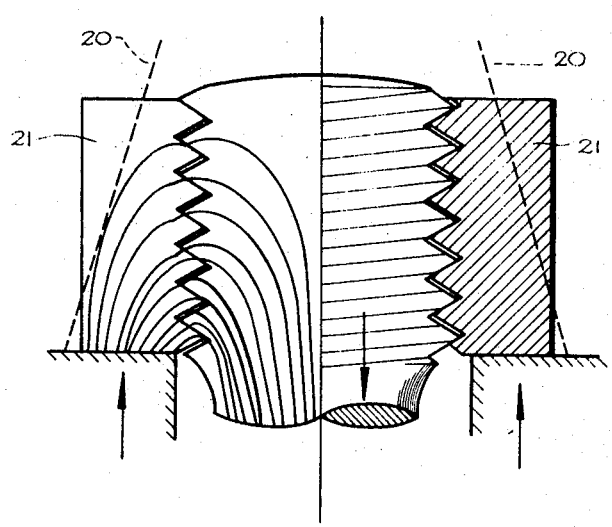
FIG. 4 is a diagrammatic view illustrating the load distribution in an ordinary nut and bolt assembly.

Thus, as indicated by the broken lines 20 in FIG. 4, the part of the nut body through which lines of stress pass is a maximum at the abutment face and tapers off gradually towards the other face, leaving a part 21 which is free of stress, or any significant stress.

Thus the nut of this invention, as above described, also satisfies the desired condition for use in a nut and bolt assembly where the bolt shank is under tension, as the maximum thickness of the wall of the nut body is provided adjacent the abutment end face 14 where the maximum concentration of lines of stress occur, and the formation of the grooves 12 only results in making absent, from the nut body, metal in the region which does not carry any significant stress when the nut is in use. The stress lines gradually decrease in concentration towards the end face 13 and thus less thickness of wall is required at this end of the nut so that the improved nut achieves a substantial reduction in the amount of metal in the wall of the nut body.

As compared with prevailing torque stiff nuts hereinbefore referred to which a have been provided with a reduced section collar, at the end remote from the abutment face, the improved prevailing torque stiff nut has a lesser overall height and also by virtue of the provision of the grooves 12 is approximately 24 percent lighter than such form of prior prevailing torque stiff nut, with a similar reduction in material cost.

Instead of the hexagonal form of nut above described, the nut may be of circular form but otherwise of similar construction with grooves 12 and buttresses 17 provided with the arcuate chamfered parts 18 and such circular form of nut can be conveniently used in cases where the nut is to be inserted into a recess in some member, with the use of a special form of wrench having projecting fingers to engage in the grooves for the purpose of tightening. It will be appreciated that the radially extending buttresses 17, in addition to providing support for the reduced or resilient end section of the nut, also provide the strength required for application of torque by such a special wrench having projecting fingers engaging in the grooves 12 and applying the torque via the radially extending buttresses 17.

This invention is not to be limited by the embodiments shown in the drawing and described herein, which are given by way of example and not of limitation, but only in accordance with the scope of the appended claims.

I claim:

1. A prevailing torque stiff nut of the type specified including a body, six grooves formed in the external surface of said body extending generally in the direction of the nut axis, each of said grooves being of a maximum depth at its end remote from the abutment face of the nut and progressively decreasing in depth in the direction towards the abutment face so as to terminated on the exterior of the nut body at a position spaced from the abutment face of the nut, each portion of the nut body, in between two adjacent grooves being in the form of a radially extending buttress defining a corner of the nut body, each buttress being chamfered at its end remote from the abutment face of the nut and two pairs of said buttresses on opposite sides of a diameter of the nut being acted upon at the end thereof remote from the abutment face in a direction along the axis of the nut to produce a force acting radially inwardly on each of such four buttresses whereby the axial depth of the chamfer on each of said four buttresses is increased and two arcuate areas of the nut thread on opposite sides of said diameter are forced radially inwardly, said arcuate areas being of substantially the same axial depth as the axial depth of the chamfer on each of said four buttresses and said two pairs of buttresses being arranged symmetrically on opposite sides of a diameter of the nut body.

2. A prevailing torque stiff nut according to claim 1, wherein each groove is of arcuate cross section and has a cross-sectional area which decreases progressively from a maximum at its end on the face of the nut remote from the abutment face to zero at its other end.

3. A prevailing torque stiff nut according to claim 2, wherein the length and cross-sectional area of each groove is such that the grooves occupy regions of the nut body in which there is no significant stress when the nut is tightened on a bolt.

4. A prevailing torque stiff nut according to claim 1, wherein each groove is of arcuate cross section and has a cross-sectional area which decreases progressively from a maximum at its end on the face of the nut remote from the abutment face to zero at its other end.

5. A prevailing torque stiff nut according to claim 4, wherein the length and cross-sectional area of each groove is such that the grooves occupy regions of the nut body in which there is no significant stress when the nut is tightened on a bolt.

6. A prevailing torque stiff nut of the type specified including a body having a internal thread at least four grooves formed in the external surface of said body at equiangularly spaced positions around the body, said grooves extending generally in the direction of the nut axis, each of said grooves being of maximum depth at the end thereof remote from the abutment face of the nut and progressively decreasing in depth in the direction towards the abutment face so as to terminate on the exterior of the nut body at a position spaced from the abutment face of the nut, each portion of the nut body, in between two adjacent grooves, being in the form of a radially extending buttress defining a corner of the body and the nut being acted upon at the end remote from the abutment face by applying a radially inwardly directed force simultaneously to each buttress of two pairs of buttresses, said two pairs being arranged symmetrically on opposite sides of a diameter of the nut body whereby two concavely arcuate portions of the nut thread on opposite sides of said diameter are positioned radially inwardly of the other portions of the nut thread circumferentially between said two arcuate portions.

7. A prevailing torque stiff nut as claimed in claim 6, having six grooves and six radially extending buttresses wherein two of said buttresses are angularly aligned with said diameter so that said inwardly displaced portions are displaced in a direction normal to said diameter and wherein said inwardly displaced area extends through an equal arc on opposite sides of a line normal to said diameter, which line bisects the groove between the buttress of each of said pairs of buttresses and wherein the thread form and pitch in said inwardly displaced areas are unaltered.

8. A prevailing torque stiff nut according to claim 7, wherein each groove is of arcuate cross section and has a cross-sectional area which decreases progressively from a maximum at its end on the face of the nut remote from the abutment face to zero at its other end.

9. A prevailing torque stiff nut according to claim 8, wherein the length and cross-sectional area of each groove is such that the grooves occupy regions of the nut body in which there is no significant stress when the nut is tightened on a bolt.